United States Patent Office.

WILLIAM O. CROCKER AND WILLIAM P. CROCKER, OF TURNER'S FALLS, MASS.

PRODUCING SULPHITE OR BISULPHITE OF SODIUM.

SPECIFICATION forming part of Letters Patent No. 339,974, dated April 13, 1886.

Application filed May 27, 1885. Serial No. 166,870. (No specimens.)

*To all whom it may concern:*

Be it known that we, WILLIAM O. CROCKER and WILLIAM P. CROCKER, both of Turner's Falls, in the county of Franklin and State of Massachusetts, have invented certain new and useful Improvements in Producing Sulphite or Bisulphite of Sodium, of which the following is a full, clear, and exact description.

The object of our invention is to produce the sulphite or bisulphite of sodium in an economical manner.

In carrying out our invention we proceed as follows: Crude or commercial sulphate of sodium is dried and mixed intimately with a proper proportion of carbonaceous matter; but an excess of such carbonaceous matter should be avoided, as it hinders the after stage in the process. The mixture is then placed in retorts on a properly-constructed furnace and roasted until it is partly or wholly deoxidized. The product is then withdrawn or the reducing heat turned off. After the roasting, if the mixture is in a finely-divided state and comparatively free from crude matter, the operation can be proceeded with; if not, the soluble parts must be leached out, and the insoluble matter is returned to the furnace with another charge, and the solution is evaporated, and the salt granulated out in the usual manner of obtaining dry salts. The dry granulated salt is then heated in contact with dry air or oxygen until it is incandescent and the incandescence permitted to continue moderately, and the mixture agitated to get a uniform chemical action until the incandescence flags. The mixture is thus reoxidized sufficiently to constitute a practical wood-reducing reagent, and consists, principally, of sulphite of sodium. A solution is made of the product, and when freed from sediment it can be introduced directly with the wood into the digesters or treated further, as follows: By adding a small quantity of bisulphite of calcium any sulphide or sulphate of sodium is decomposed, sulphate of calcium being precipitated and separated.

The solution may be charged with an additional proportion of sulphurous acid, if required, before or after introducing it into the digesters; or this acid or other acids may be injected into the digesters during the progress of the reduction to re-enforce or intensify the chemical action. The wood may also be previously treated with such reagent for the same purpose.

Sulphate of sodium can be decomposed by a sulphide, hyposulphite, or bisulphite having a base precipitated as a sulphate, the sulphide or hyposulphite of sodium resulting to be oxidized to a sulphite as above; but the previous methods will probably be preferred. The used liquid may be evaporated and the residuum treated as before; but a fresh supply of sulphate of sodium can be procured at less cost.

The advantages of this process exist in utilizing crude sulphate of sodium in such a manner as to obtain the sulphite solution directly from the sulphate without displacing the sulphur, and thus avoiding loss of sulphur and the trouble and expense of converting the sodium into a carbonate or oxide and then back again into a sulphite.

It is not claimed that the sulphite of sodium obtained is absolutely pure; but nevertheless the sulphur and sodium are sufficiently and properly oxidized to produce a practical wood-reducing solution at a small expense.

Having thus described our invention, what we claim as new, and desire to secure by Letters Patent, is—

1. The herein-described method of producing sulphite-of-sodium liquor from sulphate of sodium for the reduction of wood to pulp, consisting in mixing sulphate of sodium with carbonaceous matter, roasting the mixture, leaching out the soluble part, evaporating to dryness, granulating the product, then heating it and agitating it in contact with air or oxygen until incandescence ceases, and making into a solution, substantially as set forth.

2. The herein-described method of producing sulphite and bisulphite-of-sodium liquor from sulphate of sodium for the reduction of wood to pulp, consisting in mixing sulphate of sodium with carbonaceous matter, roasting the mixture, leaching out the soluble part, evaporating to dryness, granulating the product, then heating it and agitating it in contact with air or oxygen until incandescence ceases, converting it into a solution, and charging it with a portion of sulphurous acid, substantially as described.

3. The herein-described method of strengthening or re-enforcing the action of the sulphite of sodium in making wood pulp, consisting in providing it with an additional portion of sulphurous or other acid before the solution is introduced into the digester, substantially as set forth.

4. In converting wood into pulp by means of sulphite or bisulphite of sodium, decomposing the sulphide or sulphate of sodium by the addition of bisulphite of calcium, substantially as set forth.

WILLIAM O. CROCKER.
    WILLIAM P. CROCKER.

Witnesses:
 NATHAN D. ALLEN,
 FRANK H. BROWN.